Figure 4:
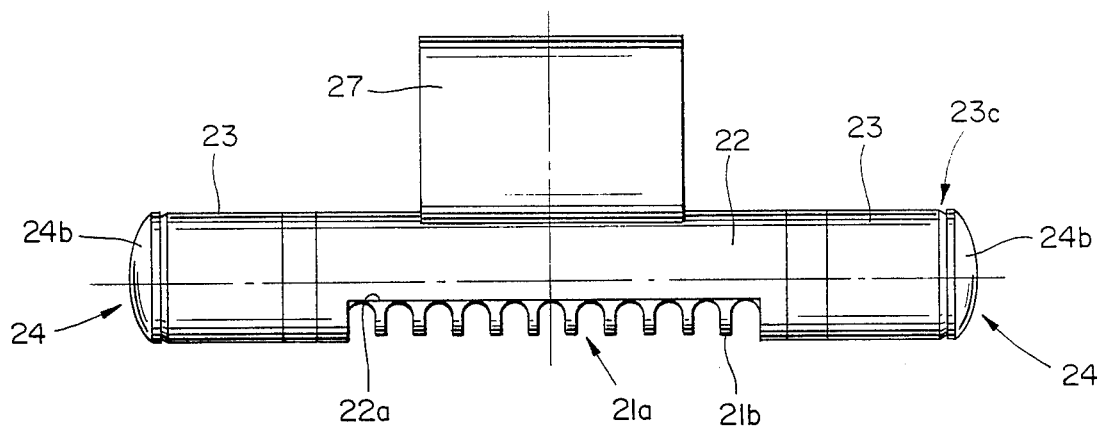

United States Patent [19]

Weick

[11] Patent Number: 4,950,457
[45] Date of Patent: Aug. 21, 1990

[54] DEVICE FOR THE EVAPORATION OF AN ACTIVE SUBSTANCE FOR THE TREATMENT OF THE AMBIENT AIR

[76] Inventor: Heinz H. Weick, 94, rue de la Servette, CH-1202, Genf, Switzerland

[21] Appl. No.: 236,357
[22] PCT Filed: Nov. 24, 1987
[86] PCT No.: PCT/CH87/00156
  § 371 Date: Jul. 28, 1988
  § 102(e) Date: Jul. 28, 1988
[87] PCT Pub. No.: WO88/03881
  PCT Pub. Date: Jun. 2, 1988

[30] Foreign Application Priority Data

Nov. 28, 1986 [CH] Switzerland ............ 4802/86
Dec. 4, 1986 [CH] Switzerland ............ 4831/86
Feb. 5, 1987 [CH] Switzerland ............ 407/87

[51] Int. Cl.[5] .............................. A61L 9/00
[52] U.S. Cl. .......................... 422/123; 239/59
[58] Field of Search ........... 422/123, 124, 305, 306; 239/44, 49, 51.5, 55-59; 261/95, 96, 99

[56] References Cited

U.S. PATENT DOCUMENTS 906,955 12/1908 Stark ..................... 239/55
1,570,104 1/1926 Vancil ................... 40/517
2,371,919 3/1945 Taylor ................... 239/51.5
2,721,098 10/1955 Mangels ................. 239/57
2,851,304 9/1958 Timmis .................. 239/56
3,747,902 7/1973 Bailey ................... 239/44
4,258,874 3/1981 Webinger et al. ..... 239/59
4,523,870 6/1985 Spector ................. 239/55

FOREIGN PATENT DOCUMENTS 32-12384 10/1957 Japan .
50-72195 4/1975 Japan .
55-65043 10/1980 Japan .
6032937 8/1983 Japan .

Primary Examiner—Christine M. Nucker
Assistant Examiner—William H. Beisner
Attorney, Agent, or Firm—Fleit, Jacobson, Cohn, Price, Holman & Stern

[57] ABSTRACT

An evaporating device having a hollow cylinder rotatably supported in a self-engaging clip casing. The cylinder is provided with transverse slits which form an evaporation window, while the evaporation window is set into the clip casing. When the hollow cylinder is turned, the evaporation windows are covered or uncovered, regulating the evaporation level. At the end regions of the hollow cylinder are cartridges loaded with pads containing an absorbent, liquid material. Straight wicks serve as evaporation elements, extending from the cartridges into the middle of the hollow cylinder. For clipping the device into place, e.g., onto the sun visor of a motor vehicle, a clip is fixed to the clip casing. The clip casing enables the hollow cylinder to be changed easily.

5 Claims, 2 Drawing Sheets

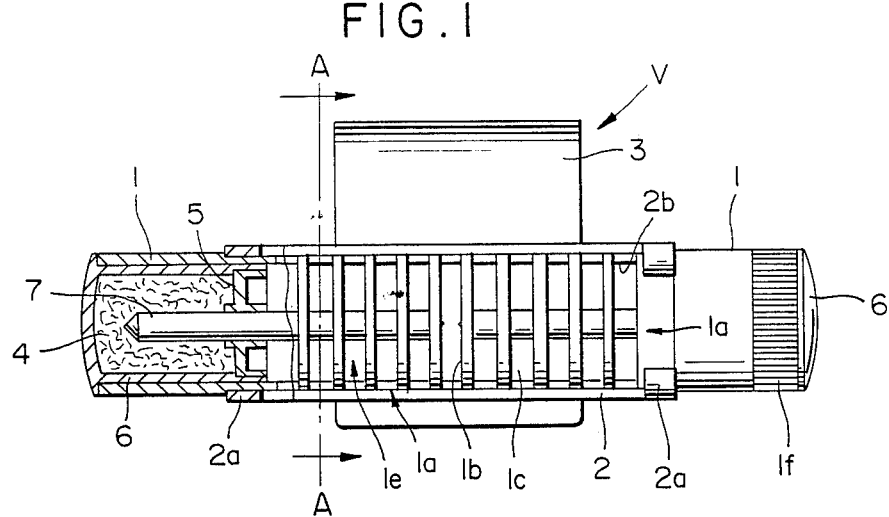
FIG. 1
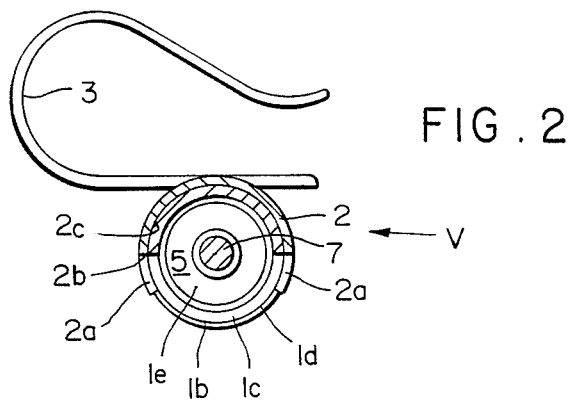
FIG. 2
FIG. 3
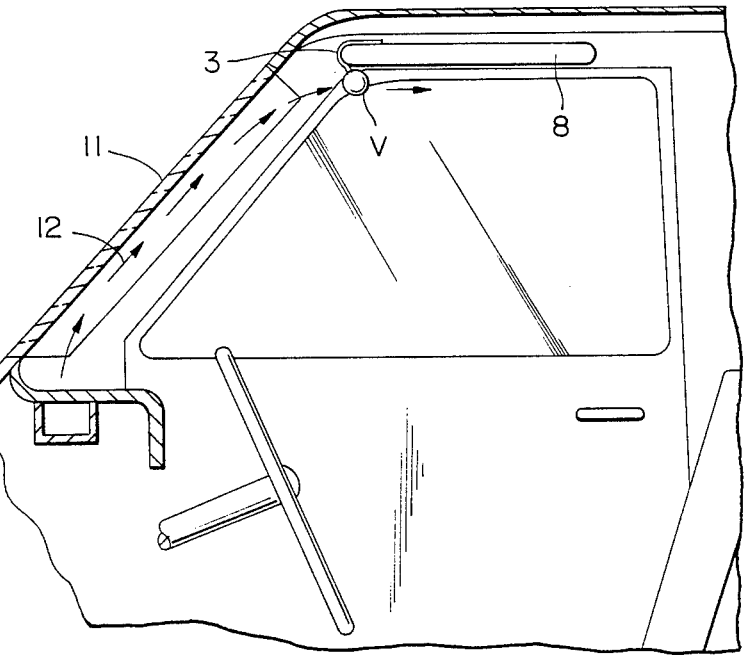

DEVICE FOR THE EVAPORATION OF AN ACTIVE SUBSTANCE FOR THE TREATMENT OF THE AMBIENT AIR

The invention is concerned with a device for the evaporation of an active substance for treating the ambient air in motor vehicles (automobiles), comprising two cylindrical tubes that are supported within one another concentrically, that surround a chamber for the active substance to be evaporated, and the jacket walls of which have been provide with one gas-permeable evaporation zone each, and which may be moved, by means of a mutually opposing adjustment of the angle of the hollow cylinders into a closed position at a displaced angle of rotation, out of a coinciding position, comprising also a fastening means mounted on the jacket of one of the two hollow cylinders and intended to place the device into an area of intensive air-flow of the inside of the motor vehicle. Devices of this type are used to deodorize the inside air as well as add to it scented, stimulating, or possibly therapeutic agents, such as e.g., eucalyptus oil in the case of inflammatory diseases of the respiratory tract.

Known devices of this kind are designed, in such a way that they may be affixed either in front of an air-outlet screen of the dashboard, or above an air outlet slit on the inside, to the wind screen. In the case of the first method of placing the device, the evaporating device slows down the air flow very considerably, while said flow, in turn, brings about an excessively rapid and, for that reason, excessively intensive evaporation, so that the delivery of the active substance is initially too high and then decreases to a minimum very rapidly.

An evaporating device that is affixed to the wind-screen, has intensive exposition to the radiation of the sun and that, once more, brings about an accelerated evaporation.

In addition, the use of either of these methods of fastening the evaporating device introduces a foreign body—that projects more or less—within the operating range of the driver of the vehicle, and that complicates the adjustments of the pertinent air outlet or the cleaning o the windscreen very considerably.

The invention is based—among other things—on the problem of eliminating those shortcomings by application of the simplest means. The object of the invention consists in the fact that the fastening means is designed as a gripping clasp that is aligned transversely in relation to the longitudinal axis of the device and the gripping (clamping) plane of which is designed more or less tangentially in relation to the device.

The device as designed in that way is fastened in a self-clamping manner, e.g. on the sun screen of the driver, in such a way that is placed on the underside of the sun screen. When the air stream of the wind screen is not turned on, the evaporatio is insignificant and may be called static. On the other hand, the air stream of the windscreen brings about a dynamic evaporation that is distinguished by a considerably higher intensity. The air stream rises up on the windscreen, is diverted toward the read, flows through the evaporating device, and hits the driver of the vehicle directly, enclosed with the active substance. E.g. when an active substance is used against fatigue, nervousness, or inflammatory diseases of the respiratory tracts, then the high concentration of the active substance entails a correspondingly intensive effect on the driver. In addition, the device which is placed in this manner, is protected from overheating by insulation and is located immediately outside the handling range of the driver.

An additional independent characteristic of the invention is concerned also the evaporation device as placed in motor vehicles and designed to be used as filling-up device. The topping-up has been done, up to this time, e.g. by unscrewing the inner hollow body from the outer hollow body that serves as a casing, and e.g. by providing it with a new tampon impregnated with the active substance.

Consequently, the further object of the invention consists in the further development of an evaporating device of this type, in the most economical way, in such a manner that a refilling of the active substance and/or the exchange of a used active substance for another can be performed by means of a simple manipulation that can be carried out even when the vehicle is in motion.

The solution in accordance with the invention is characterised by the fact that the outer hollow body has been developed as a self-engaging clip casing that presents a cross-section in the form of a part of a circle, and that extends, at least, over the length of the evaporation zone, and by the fact that the cross-section in the form of a part of a circle (form of a divided circle) presents, at least over part of the length of the clip casing, a reflex angle. The advantages achieved by these means of design are described on the basis of pertinent Figures.

In the drawing, examples of the embodiment of the invention are represented. There are shown in:

FIG. 1 a partial section of a top view of an evaporating device comprising a clamping clasp, and the hollow outer cylinder of which has been developed as a clip casing.

Figure 5:
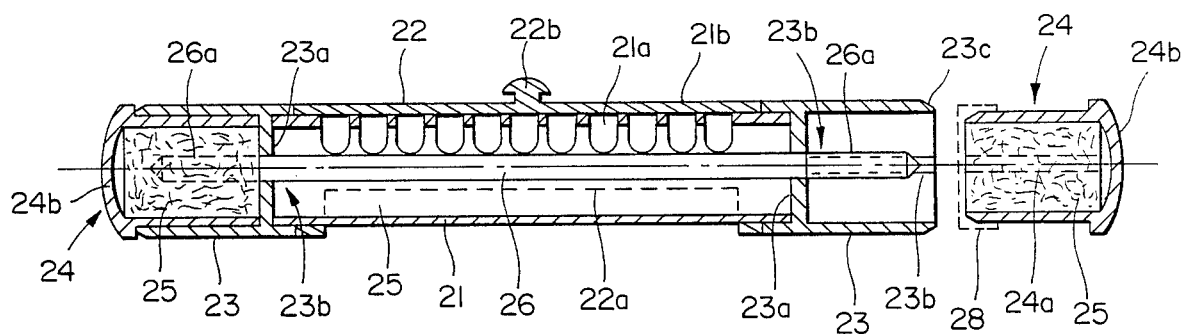

FIG. 2 a section A—A in accordance with FIG. 1,

FIG. 3 a schematic drawing of part of an interior of a motor vehicle with an evaporating device mounted on a sun screen, FIG. 4 a lateral view of an evaporating device, in which the chambers containing active substances are placed in interchangeable cartridges, FIG. 5 a longitudinal section through FIG. 4 in the plane of the drawing, FIG. 5 a cross-section through an evaporating device hollow inner body of which is provided with an interchangeable tampon impregnated with the active substance.

Figure 6:
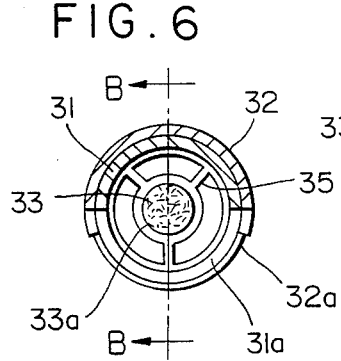
Figure 7:
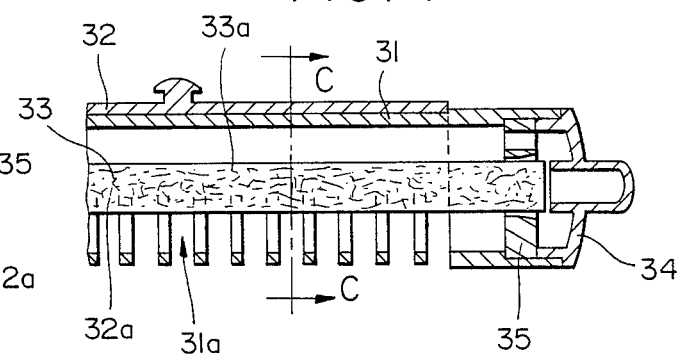
Figure 8:
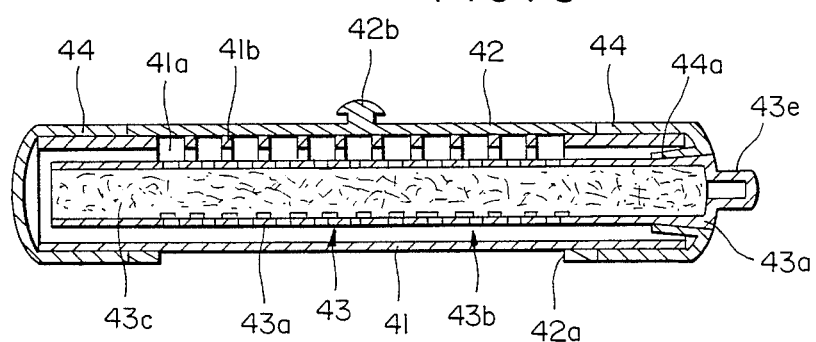

FIG. 7 a frontal, longitudinal area in accordance with FIG. 6, in a cross-section B—B, and FIG. 8 a longitudinal section through an evaporating device, the hollow inner body of which is equipped with a rod-interchangeable member containing active substance and supported in a frontal closing cap.

In accordance with the examples of embodiment of FIGS. 1 and 2, the hollow inner body 1 of the evaporating device V is designed as a hollow cylinder that has, an evaporating zone in its central (1a) longitudinal area, an evaporating window 1d which is subdivided by means of crossbars 1b into slits 1c. The evaporating window 1d has an arc measure of some 180° longitudinally. The aforementioned longitudinal area 1a has a somewhat tapered diameter and is surrounded by the hollow outer body that has been developed as a self-engaging clip casing 2, and the cross-section of which has a semi-circular diameter, while the two terminal area of the clip casing 2 surround the hollow cylinder 1 by means of firmly attached tongues, at a somewhat greater distance. Consequently, the interior surface 2c of the clip casing 2 serves as pivot bearing of the hollow cylinder 1, while its evaporating zone is constituted by its longitudinal opening its so-called evaporating window 2b. On the other side, the gripping clasp 3 that runs perpendicular to the longitudinal direction of the device, and the gripping plane of which runs, more or less, tangential to the device, is molded to the clip casing 2, on its side opposite the evaporating window 2b.

Within the terminal spaces of the hollow cylinder 1, cartridge-like casings 6 that contain tampons 4 soaked with the active agent, and are closed by covers 5. Straight wicks (7) are used as evaporating elements; they extend out of the cartridges 6 through the covers 5 into the evaporating chamber 1e of the hollow cylinder 1. For the purpose of facilitating the manual turning of the hollow cylinder 1 in relation to the clip casing 2, knurled edges if are molded to the terminal parts of the hollow cylinder 1.

In the rotational position—as shown in FIGS. 1 and 2—of the hollow cylinder 1, its evaporating window 1d coincides, in its total area, with the evaporating window 2b of the clip casing 2. In consequence thereof, the evaporation is set at a maximum. By rotation of the hollow cylinder 1, the evaporating window 1d is moved inside the clip casing 2, and in that way, the effective evaporation surface is continuously reduced to zero.

The design and arrangement of the gripping clamp 3 serve to mount the evaporating device V on the sun-screen 8 of a motor vehicle. The gripping clasp 3 is slipped on from the elongated side of the sun-screen, whereby the device is placed on the underside of the sun screen and is hit there—outside the range of manipulation of the driver of the vehicle, and protected from solar irradiation—by an air-flow 12 that rises up on the wind-screen 11 and is rerouted, above said wind screen 11, backward inside the vehicle. Said air-flow 12 brings about a considerable increase of evaporation activity. By means of a slight inclination of the pertinent sun-screen 8, it is possible to direct the air-flow exactly to the head of the driver of the vehicle and/or passenger.

It is easy to see that the hollow cylinder 1 may be pulled out of the clip casing 2 without any difficulty; it may be clipped into said clip casing with equal ease. This simplicity of handling makes it possible, even when the vehicle is in motion, to exchange a certain active substance for a substance having a different composition; that is done, in the simplest manner, by clipping in another hollow cylinder or by replacing an empty hollow cylinder by a new one. Consequently, the hollow cylinder 1 that is completely equipped with the cartridges 6 and the wicks 7 is acquired as an interchangeable unit. Inasmuch as the active substance is stored in chambers, from which it is being withdrawn gradually by means of the wicks 7, the device ensures a relatively uniform evaporation over an extended period of time.

Even though it is possible to achieve the best evaporating performance and a maximal long-time effect by equipping the hollow cylinder 1 with two interchangeable cartridges, it is possible also to equip it with one chamber for the active substance. In this case, it is possible immediately to mold onto the hollow cylinder a wall that separates the chamber with the active substance from the evaporation chamber; in that way, a slide-in cartridge 6 is not required any longer. In this case, both front-ends of the hollow cylinder would have to be closed with a simple cover. In the described example of the embodiment of the invention, the gripping clamp 3 is molded to the clip casing 2 directly. But, these two elements may also be extruded as separate parts and interconnected by means of a plug connection.

The mutual axial protection of the position alignment of the hollow cylinder 1 and the clip casing 2 is achieved—as described—by a reduction of the diameter of the hollow cylinder 1. The same end would be achieved by mounting projections, circular ribs, or arrangements of grooved ribs mounted on the jacket of the hollow cylinder 1 on both sides of the gripping clamp 3.

In the evaporating device in accordance with FIGS. 4 and 5, the inner hollow cylinder has been designated as 21. It has the evaporating window 21a which is subdivided by the cross-bars 21b and is surrounded concentrically by the outer hollow cylinder 22, i.e. it is pivoted within it. The evaporating window 22a is molded to the outer hollow cylinder 22. On the front side, the two connecting shells 23 which are provided with one separating wall 23a each, and in which exchangeable cartridges 24 are supported by grooved-rib connections 23b, 24a in a torsion-resistant manner, are molded to the inner hollow cylinder. Absorbent tampons 25 which are filled with an active substance and, e.g. consist of polyester fiber, are placed in the cartridges. The tampons 25 are interconnected by means of a straight—e.g. polyester fiber—wick 26 that extends through the bore holes 23b of the separating walls 23a as well as through the evaporating chamber 25; the free ends of said wick 26 project into the tampons. The gripping clamp 27 is not molded solidly to the outer hollow cylinder 22, but has been fastened, so as to be detachable, by means of a mushroom-like projection 22b that penetrates through a keyhole-like perforation (not shown) of the gripping clamp 27.

The device is fastened to a sun-screen in the manner described above. Since the outer hollow cylinder 22 is connected with the sun-screen by means of the gripping clamp 27, the desired evaporating preformance is set by rotating one of the two cartridge covers 24b; this movement is carried out simultaneously by the inner hollow cylinder 21. In that way, the evaporation windows 21a, 22a are made more or less to coincide, from a closing position to the maximal opening.

The ultimate consumer acquires the device together with exchangeable cartridges 24 which have not yet placed into the device, but are filled with an active substance end closed, in front, by covers 28. The device is made ready for use by the removal of the covers 28 and the insertion of the cartridges 24 into the connecting shells 23. The sloping frontal surfaces 23c of the connecting shells 23 facilitate the extraction of the cartridges 24.

It is possible to close the cartridges hermetically by means of sealed-on aluminium foil rather than by using the removable cover 28. It is not necessary to remove the aluminium foil since it can be pierced by the pointed ends of the rigid wick 26. If, instead of the continuous wick 26, two wicks of half its length were used, these wicks could be associated with the exchangeable cartridges 24, i.e. would be exchanged with them. Up to the time when the cartridges would be inserted, the wicks could be covered hermetically by removable shells. The dividing walls 23a would not be required any longer. In the case of this evaporating device being equipped with only one cartridge 23, it would be feasible, from the point of view of injection molding technique, to do without the connecting shell 23.

On the basis of FIGS. 6 and 7, is demonstrated that the wick and the chamber containing the active substance may be combined into one member. Inasmuch as the inner hollow body 31 and the outer hollow body 32, which has been designed as a clip casing, with their evaporation windows 31a, 32a are concerned, the evaporating device is identical with the first example of the embodiment of the invention. More or less centered in the hollow body 31, a tampon 33 that is exchangeable and filled with active substance, is placed; at least, parts of the surfaces of its jacket 33 are porous. The tampon 33 is inserted and/or exchanged while the cap closure 34 is open; its terminal areas rest in centering members 35 that are inserted frontally into the inner hollow body 31. When the tampon 33 is supported, alternatively, in projections (similar to hollow pins) of the closing cap 34, the centering members 35 are not required any longer.

FIG. 8 shows an alternative in regard to the design in accordance with FIGS. 6 and 7. In the inner hollow body 41, there is mounted—instead of a tampon—the red-shaped member 43 the closed, conical terminal area 43 of which is supported in a bore-hole 44a of the cap closure 44, and that presents a substantial axial projection 43e.

It is implantable and/or exchangeable by means of insertion and/or extraction and consists of a small evaporation tube 43d that is porous due to the perforations 43b of its jacket and contains a tampon 43c which is impregnated with the active substance. The volume of the small evaporation tube 43d and the size of the evaporation surface (total cross-section of the jacket perforations) may, in the design lay-out, be adjusted for a maximal and highly uniform evaporation time. The closing caps 44, 44' which are used, at the same time, to adjust the evaporating performance, are connected, in a torsion-resistant manner, with the inner hollow body 41 that comprises the evaporating window 41a which is subdivided by cross-ribs 41b; the hollow body 41 itself is pivoted in the outer hollow body 42 which comprises the evaporation window 42a. The fastening means are, once more, a retaining spring (not shown) that may be secured in position by means of the mushroom-like projection 42b of the outer hollow body 42.

More particularly, the design, in accordance with the invention, of the outer hollow body 2 as a slip casing according to FIGS. 1 and 2 is not necessitated by the equipment of the device with the retaining spring 3. Alternatively, an adhesive or magnetic sticking surface may serve as fastening means, even though these kinds of fastening are not particularly liked by the consumer.

I claim:

1. A device for the evaporation of an active substance, said device comprising:

an outer tube having a longitudinal axis and defining a portion of a cylindrical plane extending along said longitudinal axis and including a segment of said portion having means extending in said cylindrical plane from opposed terminal edges of said segment and terminating separated from each other to define a space for receiving an inner tube inserted radially through the space and to be held concentrically and frictionally within said outer tube, a inner tube having an evaporation window and means for containing an active substance releasable to an air stream, said inner tube being rotatable to an open position within said outer tube to align said evaporation window with the space of said outer tube for release of the active substance into the air and being rotatable to a closed position within said outer tube to align said evaporation window with dais segment so as to prevent release of the active substance into the air.

2. A device for the evaporation of an active substance according to the claim 1, wherein said outer tube includes a biased clip for securing the device to a sun visor of a vehicle.

3. A device for the evaporation of an active substance according to the claim 1, wherein said inner tube includes an inwardly extending radial recess with radially extending end walls between which said outer tube is rotatably positioned.

4. A device for the evaporation of an active substance according to claim 1, wherein said segment is semi-circular.

5. A device for the evaporation of an active substance, said device comprising:

an outer tube having a longitudinal axis and defining at least a semi-circular portion of a cylindrical plane extending along said longitudinal axis and including means extending in said cylindrical plane formed by opposed terminal edges of said portion terminating separated from each other to define a space for receiving an inner tube inserted radially through the space and to be held concentrically within said outer tube, an inner tube having an evaporation window and means for containing an active substance releasable to an air stream, said inner tube being rotatable to an open position within said outer tube to align said evaporation window with the space of said outer tube for release of the active substance into the air and being rotatable to a closed position within said outer tube to align said evaporation window with said portion so as to prevent release of the active substance into the air.

* * * * *